United States Patent
Leung et al.

(10) Patent No.: US 7,587,498 B2
(45) Date of Patent: Sep. 8, 2009

(54) METHODS AND APPARATUS FOR MOBILE IP DYNAMIC HOME AGENT ALLOCATION

(75) Inventors: Kent K. Leung, Mountain View, CA (US); Alpesh Patel, Santa Clara, CA (US); Stefan B. Raab, South Riding, VA (US)

(73) Assignee: Cisco Technology, Inc., San Jose, CA (US)

( * ) Notice: Subject to any disclaimer, the term of this patent is extended or adjusted under 35 U.S.C. 154(b) by 517 days.

(21) Appl. No.: 10/139,941

(22) Filed: May 6, 2002

(65) Prior Publication Data

US 2004/0202126 A1    Oct. 14, 2004

(51) Int. Cl.
*G06F 15/16* (2006.01)
(52) U.S. Cl. .................. 709/228; 709/226; 709/243; 455/435.1; 455/437; 455/439
(58) Field of Classification Search ............... 709/228, 709/226, 238, 243, 219, 227; 455/439, 437, 455/435.1, 435; 370/228, 229, 338, 251, 370/329
See application file for complete search history.

(56) References Cited

U.S. PATENT DOCUMENTS

| | | |
|---|---|---|
| 4,692,918 A | 9/1987 | Elliott et al. |
| 5,016,244 A | 5/1991 | Massey et al. |
| 5,018,133 A | 5/1991 | Tsukakoshi et al. |
| 5,159,592 A | 10/1992 | Perkins |
| 5,218,600 A | 6/1993 | Schenkyr et al. |
| 5,371,852 A | 12/1994 | Attanasio et al. |
| 5,442,633 A | 8/1995 | Perkins et al. |
| 5,457,736 A | 10/1995 | Cain et al. |
| 5,473,599 A | 12/1995 | Li et al. |
| 5,572,528 A | 11/1996 | Shuen |
| 5,659,544 A | 8/1997 | La Porta et al. |

(Continued)

FOREIGN PATENT DOCUMENTS

EP    1058421    12/2000

(Continued)

OTHER PUBLICATIONS

C Perkins, IP mobility Support, IBM, Oct. 1996, RFC 2002, Network Working Group, XP-002187650, pp. 1-76.*

(Continued)

*Primary Examiner*—Patrice Winder
*Assistant Examiner*—Asghar Bilgrami
(74) *Attorney, Agent, or Firm*—Weaver Austin Villeneuve & Sampson LLP

(57) ABSTRACT

In accordance with one aspect of the invention, methods and apparatus for distributing a Mobile IP registration request to one of a plurality of Home Agents are disclosed. A registration request is received from a Foreign Agent to which the Mobile Node has roamed. One of the plurality of Home Agents is selected. The registration request is then forwarded to the selected one of the plurality of Home Agents. The source IP address of the registration request is an IP address of the Foreign Agent to which the Mobile Node has roamed, thereby enabling the selected one of the plurality of Home Agents to send a Mobile IP registration reply directly to the Foreign Agent without interception by the network device.

45 Claims, 8 Drawing Sheets

U.S. PATENT DOCUMENTS

| | | | |
|---|---|---|---|
| 5,793,762 | A | 8/1998 | Penners et al. |
| 5,901,352 | A | 5/1999 | St-Pierre et al. |
| 6,137,791 | A | 10/2000 | Frid et al. |
| 6,144,671 | A | 11/2000 | Perinpanathan et al. |
| 6,160,804 | A | 12/2000 | Ahmed et al. |
| 6,167,513 | A | 12/2000 | Inoue et al. |
| 6,195,705 | B1 * | 2/2001 | Leung ............... 709/245 |
| 6,407,988 | B1 | 6/2002 | Agraharam et al. |
| 6,421,714 | B1 | 7/2002 | Rai et al. |
| 6,487,605 | B1 | 11/2002 | Leung |
| 6,567,664 | B1 | 5/2003 | Bergenwall et al. |
| 6,651,105 | B1 | 11/2003 | Bhagwat et al. |
| 6,707,809 | B1 * | 3/2004 | Warrier et al. ............... 370/351 |
| 6,732,177 | B1 * | 5/2004 | Roy ............... 709/227 |
| 6,771,623 | B2 | 8/2004 | Ton |
| 6,795,705 | B1 * | 9/2004 | Warrier et al. ............ 455/435.1 |
| 6,839,338 | B1 * | 1/2005 | Amara et al. ............... 370/338 |
| 6,856,624 | B2 * | 2/2005 | Magret ............... 370/392 |
| 6,970,443 | B2 | 11/2005 | Dynarski et al. |
| 6,987,771 | B2 | 1/2006 | Shimizu et al. |
| 7,003,282 | B1 | 2/2006 | Ekberg |
| 7,065,067 | B2 | 6/2006 | Song et al. |
| 7,069,015 | B2 | 6/2006 | Veerepalli et al. |
| 7,284,057 | B2 | 10/2007 | Kulkarni et al. |
| 7,409,549 | B1 | 8/2008 | Leung et al. |
| 2001/0012777 | A1 * | 8/2001 | Igarashi et al. ............... 455/435 |
| 2001/0021175 | A1 | 9/2001 | Haverinen |
| 2002/0009066 | A1 | 1/2002 | Shimizu et al. |
| 2002/0026527 | A1 | 2/2002 | Das et al. |
| 2002/0039367 | A1 * | 4/2002 | Seppala et al. ............... 370/401 |
| 2002/0065785 | A1 | 5/2002 | Tsuda |
| 2002/0067704 | A1 * | 6/2002 | Ton ............... 370/329 |
| 2002/0080752 | A1 | 6/2002 | Johansson et al. |
| 2002/0114323 | A1 | 8/2002 | Chowdhury et al. |
| 2002/0114469 | A1 | 8/2002 | Faccin et al. |
| 2003/0016655 | A1 * | 1/2003 | Gwon ............... 370/352 |
| 2003/0018810 | A1 | 1/2003 | Karagiannis et al. |
| 2003/0073439 | A1 | 4/2003 | Wenzel |
| 2003/0147537 | A1 * | 8/2003 | Jing et al. ............... 380/277 |
| 2003/0182433 | A1 | 9/2003 | Kulkarni et al. |
| 2004/0029584 | A1 | 2/2004 | Le et al. |
| 2004/0174876 | A1 | 9/2004 | Pierce et al. |
| 2004/0184420 | A1 * | 9/2004 | Xu et al. ............... 370/328 |
| 2005/0025091 | A1 | 2/2005 | Patel |
| 2005/0198506 | A1 | 9/2005 | Qi et al. |
| 2006/0072759 | A1 | 4/2006 | Gundavelli et al. |
| 2006/0104247 | A1 | 5/2006 | Dommety et al. |
| 2008/0002684 | A1 | 1/2008 | Kumazawa et al. |

FOREIGN PATENT DOCUMENTS

| | | |
|---|---|---|
| EP | 1058421 A2 | 12/2000 |
| EP | 1089580 | 4/2001 |
| EP | 1134991 | 9/2001 |
| JP | 2001-169341 | 6/2001 |
| WO | 01/06734 | 1/2001 |
| WO | 01/26322 | 4/2001 |
| WO | 2004049672 | 6/2004 |

OTHER PUBLICATIONS

Release notes for 3Com Corporation, "Conducting a Redundant Route for Network Resiliency," Mar. 1994, *NET Builder Family Bridge/Router* pp. 26-29.

J. Moy, RFC 1247 "OSPF Version 2," Jul. 19, 1991.

D. Oran, RFC 1142 "OSI IS-IS Intra-domain Routing Protocol," Feb. 1990.

Uyless Black, "TCP/IP and Related Protocols," 1992, *McGraw-Hill, Inc.*, pp. 226-249.

T. Li, et al., RFC 2281 "Cisco Hot Standby Router Protocol (HSRP)," Mar. 1998.

Chambless, et al., "Home Agent Redundancy Protocol (HARP)," Oct. 27, 1997.

C. Perkins, "*IP Mobility Support*," RFC2002, IBM Corporation, Oct. 1996.

"*Mobile IP*," Release 12.0(1)T, pp. 1-55.

Montenegro, G., "*Reverse Tunneling for Mobile IP*," RFC 2344, Sun Microsystems, Inc., pp. 1-19, May 1998.

D. Harkins and D. Carrel, "*The Internet Key Exchange (IKE)*," Cisco Systems, pp. 1-33, Jun. 1998.

D. Cong and M. Hamlen, and C. Perkins, "*The Definitions of Managed Objects for IP Mobility Support using SMIv2*," RFC2006, Motorola and IBM, pp. 1-52, Oct. 1996.

Perkins and Calhoun, "Generalized Key Distribution Extensions for Mobile IP" draft-ietf-mobileip-gen-key-01.txt,, Mobile IP Working Group, Internet Draft, Aug. 27, 2001, 7 pages.

C. Finseth, "*An Access Control Protocol, Sometimes Called TACACS*," RFC1492, pp. 1-15, Sep. 13, 1992.

D. Carrel and Lol Grant, "*The TACACS+ Protocol*," Network Working Group, Internet-Draft, Cisco Systems, pp. 1-42, Jan. 1997.

C. Rigney, "*RADIUS Accounting*," RFC 2139, Livingston, pp. 1-25, Apr. 1997.

C. Rigney, et al., "*Remote Authentication Dial in User Service (RADIUS)*," RFC 2138, pp. 1-65 Apr. 1997.

Aboba and Beadles, "*The Network Access Identifier*" RFC 2486, Jan. 1999.

Calhoun and Perkins, "*Mobile IP Network Access Identifier Extension*", Jan. 12, 2000.

Postel, J., "*Simple Mail Transfer Protocol*", STD 10, RFC821, Aug. 1982.

Crocker, D. and P. Overrell, "*Augmented BNF For Syntax Specifications: ABNF*", RFC 2234, Nov. 1997.

Jue J.P. et al. "Design and Analysis of a Replicated Server Architecture for Supporting IP-Host Mobility" Mobile computing and Communications Review, ACM, New York, NY, US, vol. 2, No. 3, Jul. 1, 1998, pp. 16-23, XP000768934 ISSN: 1091-1669 abstract.

Hunt G D H et al.: "Network Dispatcher: a connection router for scalable Internet services" Computer Networks and ISDN Systems, North Holland Publishing. Amsterdam, NL, vol. 30, No. 1-7, Apr. 1, 1998, pp. 347-357, XP004121412 ISSN: 0169-7552.

Perkins C: Request for Comments: 2002, IP Mobility Support IETF RFC, Oct. 1996, XP002222715 Retrieved from the Internet: URL:http://www.ietf.org/rfc/rfc2002.txt?number=2002 retrieved on Nov. 28, 2002, p. 39.

International Search Report PCT/US 03/13926 mailed Aug. 22, 2003, 4 Pages.

Leung et al., "Methods and Apparatus for Dynamic Home Agent Assignment in Mobile IP" U.S. Application filed on Dec. 11, 2001.

Perkins c: "RFC 2002: IP Mobility Support", Request for Comments, Oct. 1996, XP002187650, Retrieved from the Internet: URL:http://www.isi.edu/in-notes/rfc2002.txt, retrieved on Jan. 17, 2002, pp. 24-55.

Jue J.P. et al., "Design and Analysis of Replicated Servers to Support IP-Host Mobility in Enterprise Networks" Communications, 1997, ICC 97 Montreal Towards the Knowledge Millennium, 1997, IEEE International Conference on Montreal, Que., Canada Jun. 8-12, 1997, New York, NY, USA, IEEE, US, Jun. 8, 1997, pp. 1256-1260, XP010226957.

International Search Report, Application No. PCT/US 03/02828, mailed Sep. 5, 2003; 4 pages.

Examiner's Communication pursuant to Article 96(2) EPC dated May 12, 2006 from European Patent Application No. 03715961.3.

International First OA, Chinese Pat Application No. 03800009.1, Office Action issued Oct. 14, 2005.

U.S. Office Action dated Dec. 14, 2005 from related U.S. Appl. No. 10/015,247.

U.S. Office Action dated Jun. 1, 2006 from related U.S. Appl. No. 10/015,247.

U.S. Office Action dated Nov. 28, 2006 from related U.S. Appl. No. 10/015,247.

U.S. Office Action dated Apr. 10, 2007 from related U.S. Appl. No. 10/015,247.

U.S. Office Action dated May 19, 2005 from related U.S. Appl. No. 10/084,698.

U.S. Office Action dated Nov. 18, 2005 from related U.S. Appl. No. 10/084,698.

U.S. Office Action dated Feb. 17, 2006 from related U.S. Appl. No. 10/084,698.

U.S. Office Action dated Jul. 17, 2006 from related U.S. Appl. No. 10/084,698.

Notice of Allowance dated Jun. 1, 2007 from related U.S. Appl. No. 10/084,698 and Allowed Claims.

U.S. Office Action dated Sep. 14, 2007 from related U.S. Appl. No. 10/015,247.

EP Office Action dated Mar. 13, 2007 from related European Application No. 03724437.3.

Leung et al., "Methods and Apparatus for Dynamic Home Agent Assignment in Mobile IP" U.S. Application filed on Dec. 11, 2001.

Notice of Allowance and Allowed Claims dated Mar. 25, 2008 from related U.S. Appl. No. 10/015,247 33 pages.

Australian Office Action dated May 8, 2008 from corresponding AU Application No. 2003231298, 2 pgs.

Japanese Office Action dated Jun. 2, 2008 from corresponding JP Application No. 2004-504484, 4 pgs.

Internet Data Center Perfect Guide 2, pp. 90-103. (Ref cited in JP OA).

Nikkei Internet Technology, No. 49, pp. 146-162. (Ref cited in JP OA).

* cited by examiner

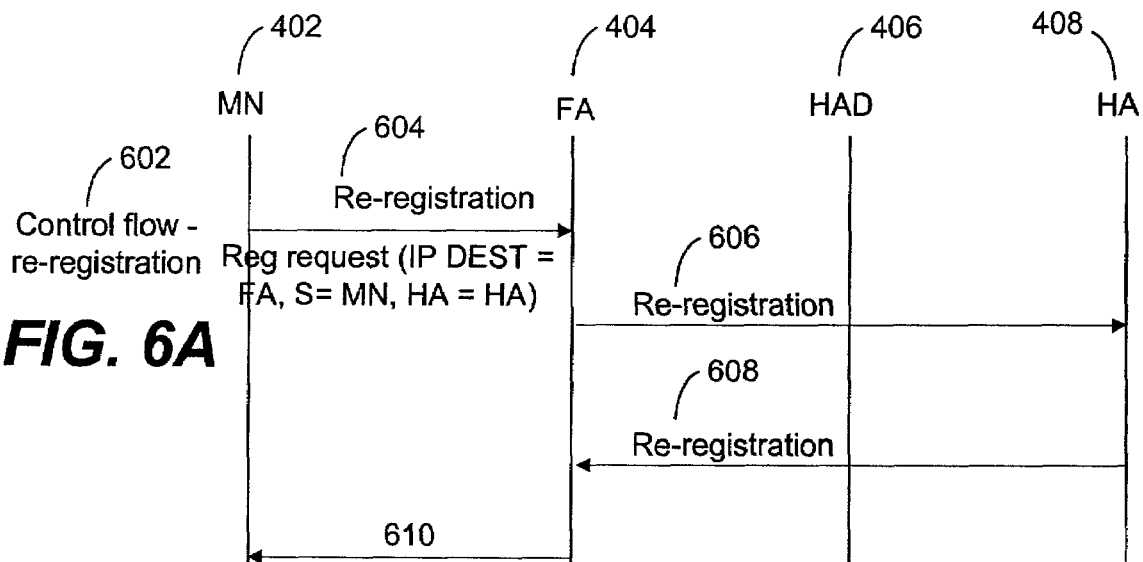
Control flow - re-registration
FIG. 6A
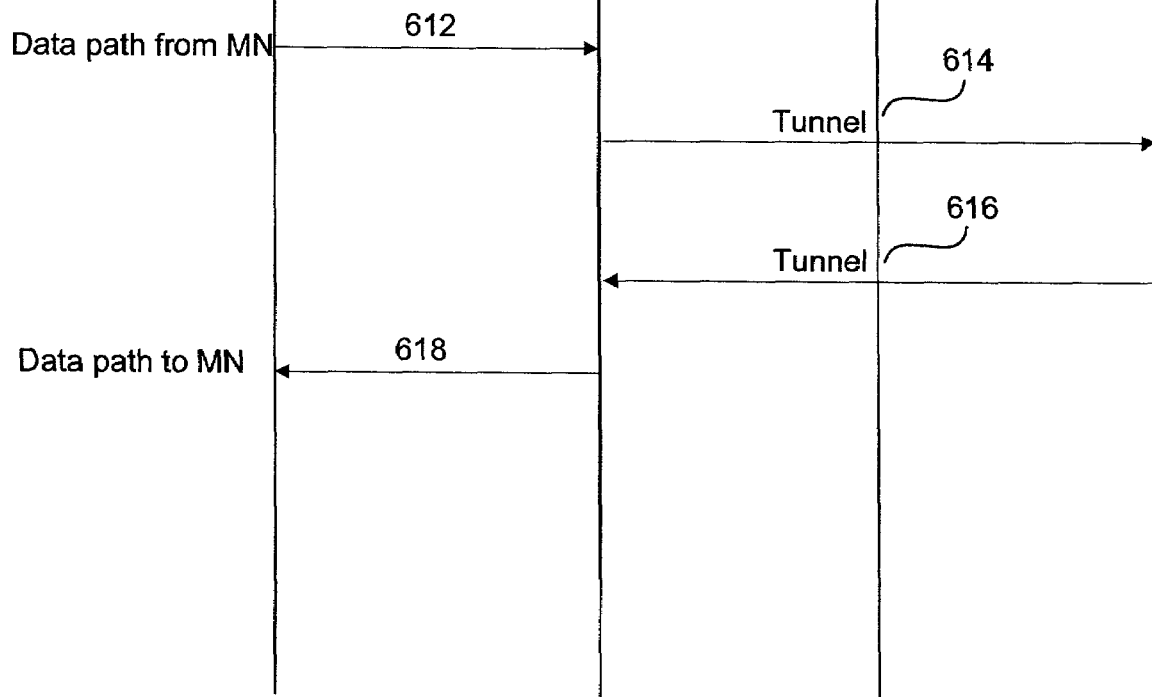
Data flow - FIG. 6B

METHODS AND APPARATUS FOR MOBILE IP DYNAMIC HOME AGENT ALLOCATION

BACKGROUND OF THE INVENTION

1. Field of the Invention

The present invention relates to Mobile IP network technology. More particularly, the present invention relates to enabling dynamic Home Agent assignment in Mobile IP using a cluster of Home Agents.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the IP Routing for Wireless/Mobile Hosts Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various agent solicitations and agent advertisements which form part of the Mobile IP protocol. When Mobile Node 6 engages with network segment 14, it composes a registration request for the Home Agent 8 to bind the Mobile Node's current location with its home location. Foreign Agent 10 then relays the registration request to Home Agent 8 (as indicated by the dotted line "Registration"). During the registration process, the Home Agent and the Mobile Node 6 may then negotiate the conditions of the Mobile Node's attachment to Foreign Agent 10. For example, the Mobile Node 6 may request a registration lifetime of 5 hours, but the Home Agent 8 may grant only a 3 hour period. Therefore, the attachment may be limited to a period of time. When the negotiation is successfully completed, Home Agent 8 updates an internal "mobility binding table" which links the Mobile Node's current location via its care-of address (e.g., a collocated care-of address or the Foreign Agent's IP address) to the identity (e.g., home address) of Mobile Node 6. Further, if the Mobile Node 6 registered via a Foreign Agent, the Foreign Agent 10 updates an internal "visitor table" which specifies the Mobile Node address, Home Agent address, etc. In effect, the Mobile Node's home base IP address (associated with segment 12) has been binded to the care-of address such as the Foreign Agent's IP address (associated with segment 14).

Now, suppose that Mobile Node 6 wishes to send a message to a Correspondent Node 18 from its new location. An output message from the Mobile Node is then packetized and forwarded through Foreign Agent 10 over the internet 4 to Correspondent Node 18 (as indicated by the dotted line "packet from MN") according to a standard Internet Protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

As indicated above, each mobile node has a designated Home Agent. As specified in RFC 2002, a mobile node is pre-configured with information identifying its Home Agent. In addition, both the mobile node and its Home Agent are also pre-configured with a shared key and Security Parameter Index (SPI) for the shared key, commonly referred to as a security association. Similarly, each Home Agent is pre-configured with information identifying mobile nodes that it supports as well as the corresponding security associations. In this manner, a mobile node is "anchored" to a specific Home Agent to enable it to subsequently register with that Home Agent and receive messages via that Home Agent from Correspondent Nodes.

There are various disadvantages associated with the pre-assignment of a specific Home Agent to a mobile node. For instance, the mobile node may be a cell phone that has been activated on the West Coast, and will therefore be assigned a Home Agent on the West Coast. However, the user of that cell phone may wish to travel to the East Coast. Thus, when the mobile node roams to a Foreign Agent, that Foreign Agent will therefore be on the East Coast. Of course, the user will remain anchored to the Home Agent on the West Coast due to pre-configuration. In the case of a Correspondent Node sending packets to a mobile node, both located on the East Coast, traffic must still travel to the pre-assigned Home Agent on the West Coast for those packets to be tunneled to the mobile node. As a result, the communication path between the mobile node and the Correspondent Node, both located on the East Coast, is unnecessarily long. Accordingly, the pre-assignment of a Home Agent to a Mobile Node results in less than optimal performance.

Another disadvantage with pre-assignment of a specific Home Agent to each mobile node is the non-dynamic nature of such pre-assignments. As described above, each mobile node and Home Agent must be pre-configured with specific information anchoring each mobile node to a specific Home Agent. This requires the configuration information to be known ahead of time as well as manually configured for each device. Thus, even when there are multiple Home Agents on a single home network, since each Home Agent must be statically configured, it is impossible to dynamically distribute registration requests among the Home Agents. It would therefore be beneficial if a "lightly loaded" Home Agent could share the load of a "heavily loaded" Home Agent.

Currently, a single Home Agent (HA) can support up to approximately 500,000 bindings due to hardware and software restrictions. However, service providers have a large number of Mobile IP subscribers. A single service provider typically has millions of Mobile IP subscribers. Unfortunately, a single Home Agent cannot support this requirement. In order to solve this problem, multiple Home Agents are often used. However, even when multiple Home Agents are implemented, the Mobile Nodes must each be configured with a single Home Agent address. In other words, the Mobile Nodes are configured with separate HA addresses. This solution therefore requires a great deal of administrative support and does not scale with the increase in Mobile IP subscribers that are likely in the near future.

In view of the above, it would be desirable if a more scalable solution could be developed which would enable Mobile IP subscribers to be supported by multiple Home Agents. More specifically, it would be beneficial if multiple Home Agents could be used to simultaneously support multiple Mobile Nodes without requiring the Mobile Nodes to be configured with a specific Home Agent address.

SUMMARY OF THE INVENTION

The present invention supports Home Agent clustering through the use of a cluster of Home Agents, which will be referred to interchangeably as a Home Agent farm or Home Agent pool. This can be used to support dynamic Home Agent assignment or support load balancing. This is accomplished, in part, through the Mobile Node sending an initial registration request to a Home Agent Director (HAD), which directs the registration request to one of a plurality of Home Agents. In this manner, Mobile IP subscribers may be supported by multiple Home Agents, rather than a single, statically configured Home Agent.

In accordance with one aspect of the invention, methods and apparatus for distributing a Mobile IP registration request by a Home Agent Director to one of a plurality of Home Agents are disclosed. A registration request is forwarded by a Foreign Agent (or Mobile Node) to the HAD. More specifically, in one embodiment, the registration request is received by the Home Agent Director from a Foreign Agent to which the Mobile Node has roamed or directly from the Mobile Node. The HAD then selects one of the plurality of Home Agents. The registration request is then forwarded to the selected Home Agent. The source IP address of the registration request is an IP address of the Foreign Agent to which the Mobile Node has roamed, thereby enabling the selected one of the plurality of Home Agents to send a Mobile IP registration reply directly to the Foreign Agent without interception by the network device.

In accordance with another aspect of the invention, the HAD may select one of the plurality of Home Agents prior to forwarding the registration request. This selection process may be based upon load information, availability information and/or health information associated with the Home Agents in the Home Agent cluster. In this manner, registration requests may be distributed such that the most efficient and reliable service is provided to the Mobile IP subscribers.

In accordance with another aspect of the invention, before forwarding a registration request to a Home Agent in a cluster, the HAD creates a temporary binding. This is done to ensure that successive registrations from the same Mobile Node within the duration for which the binding is maintained are forwarded to the same Home Agent as the first binding. This prevents a Mobile Node sending multiple registration requests from creating bindings at multiple Home Agents.

In accordance with yet another aspect of the invention, HAD redundancy is enabled by supplying temporary bindings to one or more backup HADs. For instance, the bindings that are sent may include temporary bindings. In this manner, the HAD may also transmit all bindings (e.g., temporary) maintained by it to a backup that may operate in the event of its own failure. Through the use of the temporary bindings, the HAD may prevent the sending of multiple registration requests for a single Mobile Node to different Home Agents. In other words, the HAD ensures that multiple registration requests received from a single Mobile Node are forwarded to the same Home Agent.

In accordance with yet another aspect of the invention, the HAD does not intercept data packets sent from a Mobile Node to a Correspondent Node. In addition, the HAD does not intercept subsequent registration requests sent by the Mobile Node to the selected Home Agent. The Mobile Node may re-register directly with the Home Agent when it's lifetime expires or when the lifetime is close to expiring.

Various network devices may be configured or adapted for intercepting, generating, modifying, and transmitting packets to implement the disclosed functionality. These network devices include, but are not limited to, servers (e.g., hosts), routers, and switches. Moreover, the functionality for the above-mentioned virtualization processes may be implemented in software as well as hardware.

Yet another aspect of the invention pertains to computer program products including machine-readable media on which are provided program instructions for implementing the methods and techniques described above, in whole or in part. Any of the methods of this invention may be represented, in whole or in part, as program instructions that can be provided on such machine-readable media. In addition, the invention pertains to various combinations and arrangements of data generated and/or used as described herein. For example, packets having the format described herein and provided on appropriate media are part of this invention.

These and other features of the present invention will be described in more detail below in the detailed description of the invention and in conjunction with the following figures.

BRIEF DESCRIPTION OF THE DRAWINGS

FIG. 6A is a control flow diagram illustrating a method of processing subsequent registration requests in accordance with various embodiments of the invention.

FIG. 6B is a data flow diagram illustrating a method of transmitting a data packet between a Mobile Node and a Corresponding Node in accordance with various embodiments of the invention.

DETAILED DESCRIPTION OF THE PREFERRED EMBODIMENTS

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Figure 1:
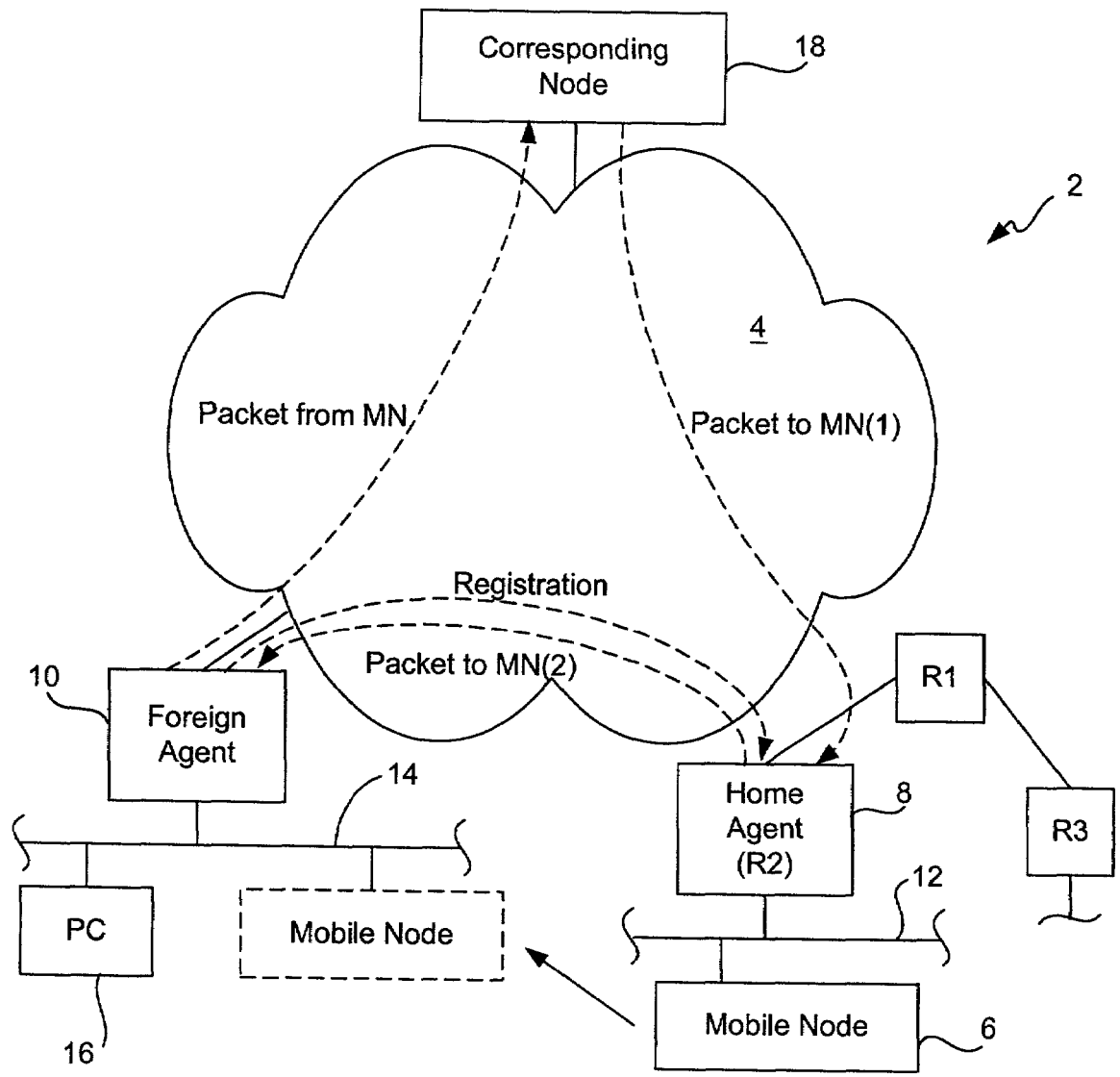
FIG. 1 is a diagram of a Mobile IP network segment and associated environment.
Figure 2:
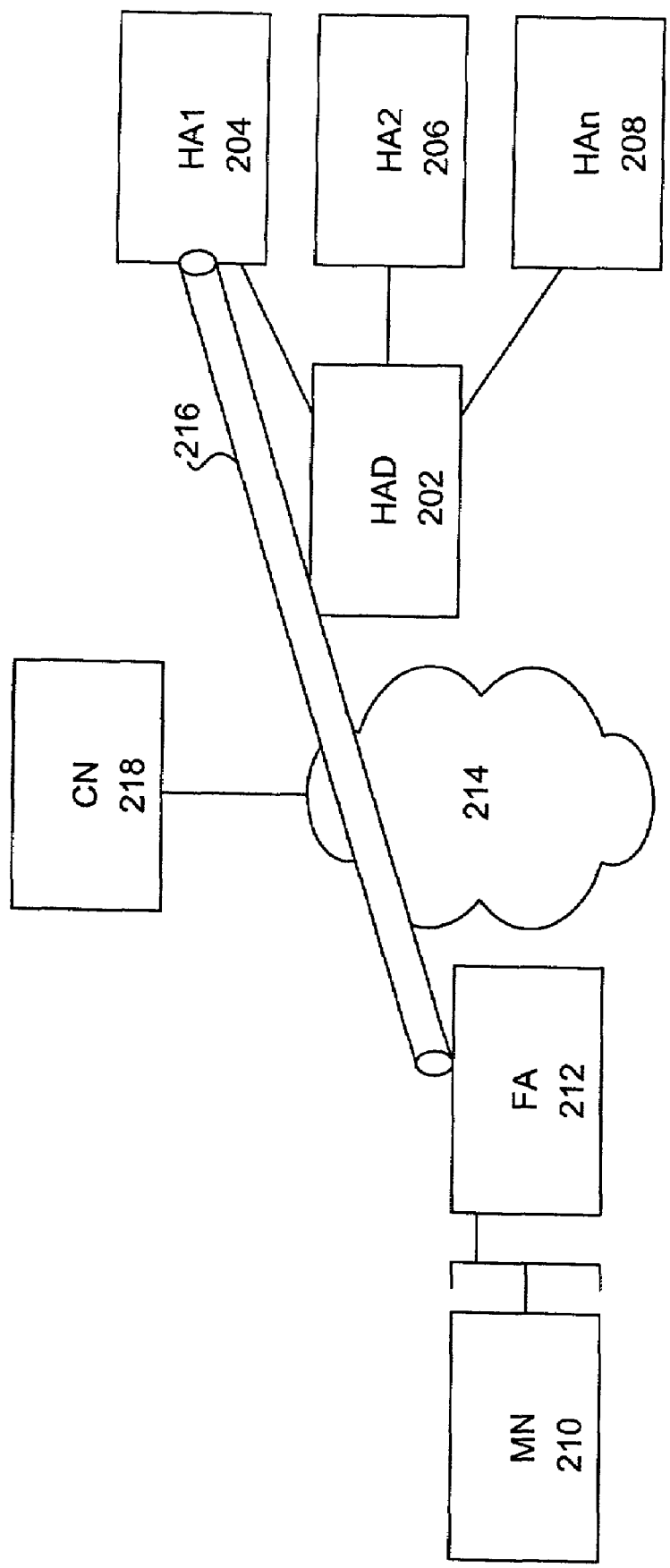
FIG. 2 is a block diagram illustrating an exemplary system in which the present invention may be implemented.

FIG. 2 is a block diagram illustrating an exemplary system in which the present invention may be implemented. The present invention enables Home Agent clustering using a Home Agent farm or pool to be implemented. As shown, a main Home Agent Director (HAD) 202, serves as a Home Agent cluster controller or load balancer for a farm or pool of Home Agents including one or more Home Agents. In this example, the cluster includes a first Home Agent HA1 204, second Home Agent HA2 206, and additional Home Agent HAn 208. Thus, the cluster includes n Home Agents. More particularly, the HAD 202 (e.g., router or switch) serves as an intermediary to forward initial registration requests to the appropriate Home Agent. When the Mobile Node 210 roams to a Foreign Agent 212, the Foreign Agent 212 forwards the registration request via the Internet 214 to the HAD 202. The HAD 202 determines whether a binding (e.g., temporary binding) exists for the Mobile Node. If the binding exists, the Home Agent is identified and selected as the Home Agent to process the registration request. Otherwise, a Home Agent is selected. In this example, the Home Agent that is selected is HA1 204.

In accordance with one embodiment, the HAD 202 and the clustered Home Agents 204-208 are layer 2 adjacent. In other words, the HAD 202 and the clustered Home Agents 204-208 are directly connected to the same subnet and share a common Internet medium. Thus, there are no hops (e.g., routers) separating the primary Home Agent 202 from the clustered Home Agents 204-208. Alternatively, in accordance with another embodiment, the HAD 202 and the clustered Home Agents 204-208 are not layer 2 adjacent.

In accordance with one embodiment, when a registration request is forwarded to a Home Agent in the Home Agent cluster, a temporary binding is created and maintained until the Mobile Node is registered with that Home Agent. More particularly, if a subsequent registration request is received from the Mobile Node (e.g., within a specified period of time), the primary Home Agent 202 may ascertain that a previous registration request from the Mobile Node 210 is already pending, thereby sending subsequent registration requests to the same Home Agent and thus preventing the sending of multiple registration requests to different Home Agents. The temporary bindings may also be used to provide redundancy during a transition period, enabling the temporary bindings to be sent to one or more backup HADs.

The HAD does not intercept registration replies or data packets sent to or from the Mobile Node. As a result, the temporary bindings will be deleted upon expiration of the time specified in the temporary bindings rather than being converted to permanent bindings. The HAD does not intercept subsequent re-registration requests directed to a Home Agent, such as when a lifetime has expired or is close to expiration.

Figure 3:
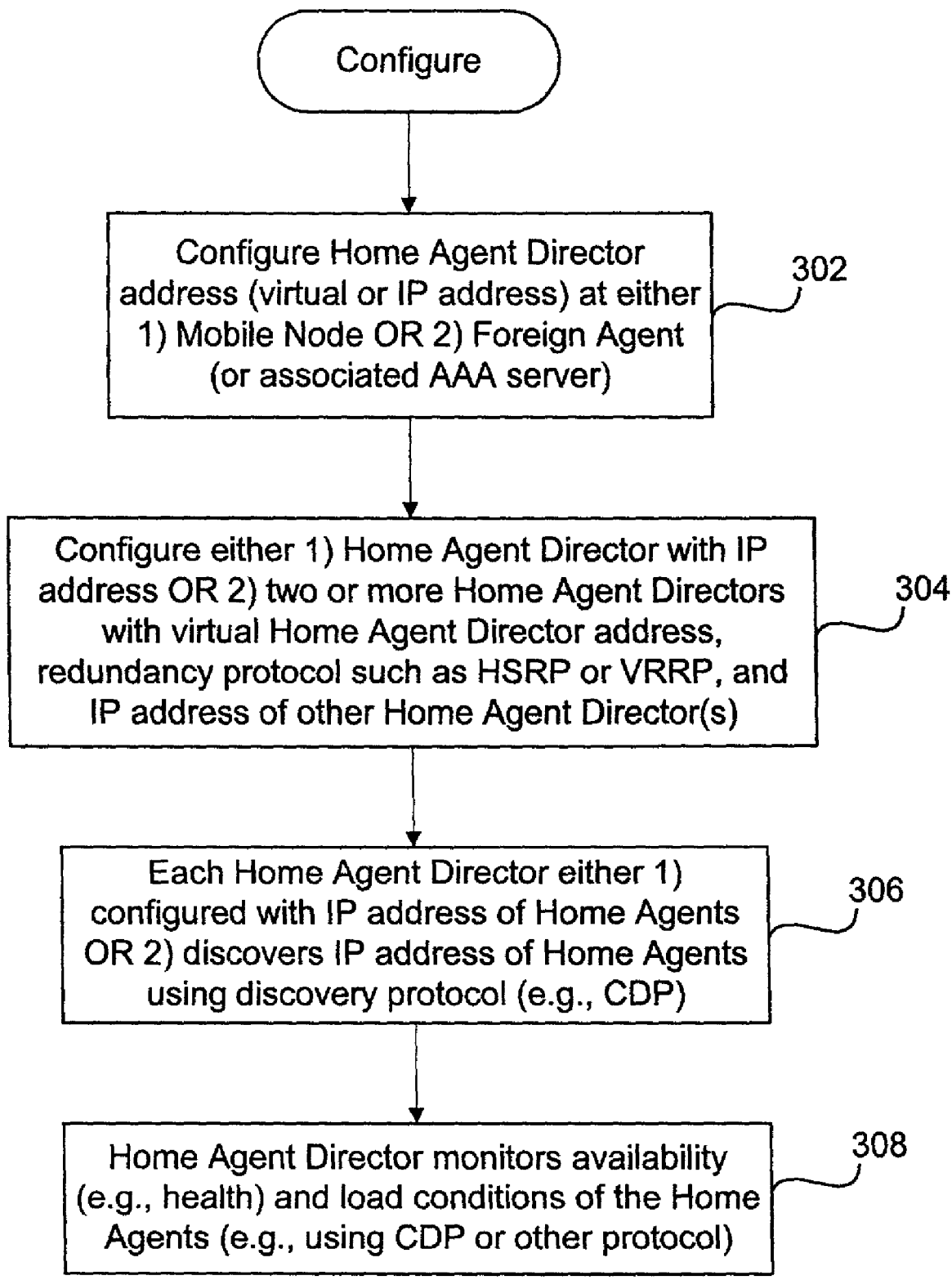
FIG. 3 is a process flow diagram illustrating a method of configuring the Mobile Node, the Home Agent Director(s) and the Home Agents in accordance with various embodiments of the invention.

FIG. 3 is a process flow diagram illustrating a method of configuring the Mobile Node, one or more HADs and the Home Agents in accordance with various embodiments of the invention. As shown at block 302, the IP address of a HAD or virtual IP address associated with two or more HADs are configured so that the appropriate IP address may be provided as the destination IP address in the registration request. More particularly, the IP address (e.g., virtual IP address) may be configured at the Mobile Node, the Foreign Agent, or otherwise obtained by the Foreign Agent. For instance, the Foreign Agent may obtain the IP address from a AAA server. The term AAA server will be used to refer to a server that can provide authorization and accounting services as well as authentication services.

Various protocols such as the Remote Authentication Dial In User Service (RADIUS) and TACACS+ may be implemented to implement a AAA server. In addition, this protocol may similarly be implemented on each Foreign Agent that communicates with the server. RFC 2138 describes the RADIUS Protocol and is hereby incorporated by reference. Similarly, RFC 1492 describes TACACS and the Internet-Draft "The TACACS+ Protocol Version 1.78," available at http:/www.ietf.org/internet-drafts/draft-grant-tacacs-02.txt, describes TACACS+. Both of these documents are incorporated herein by reference for all purposes. RADIUS and TACACS+ conventionally provide authentication, authorization, and accounting services. Thus, these protocols are well suited for the servers of the present invention. However, the invention is not limited to these protocols. Other authentication, authorization, and accounting protocols may be used.

Each HAD is configured with an associated IP address at block 304. More specifically, a single HAD may be configured with the IP address. Alternatively, one or more HADs adapted for performing the disclosed functionality may be configured with the virtual IP address as well as a routing redundancy protocol such as Hot Standby Router Protocol (HSRP) or Virtual Router Redundancy Protocol (VRRP). In addition, the HADs are preferably configured with an IP address of the remaining HADs so that they may communicate temporary binding information with one another.

HSRP is widely used to back up primary routers for a network segment. In HSRP, a "standby" or "secondary" router is designated as the back-up to an "active" or "primary" router. The standby router is linked to the network segment or segments serviced by the active router. The active and standby routers share a "virtual IP address" and possibly a "virtual Media Access Control (MAC) address." All internet communication to and from the relevant sub-network employs the virtual IP and MAC addresses. At any given time, the active router is the only router adopting the virtual addresses. Then, if the active router should cease operation for any reason, the standby router immediately takes over its load (by adopting the virtual addresses). Further details of HSRP can be found in RFC 2281, "Cisco Hot Standby Router Protocol (HSRP)" by T. Li, B. Cole, P. Morton, and D. Li and in U.S. Pat. No. 5,473,599 issued to Li and Cole on Dec. 5, 1995. Both of these references are incorporated herein by reference in their entireties and for all purposes. In addition, details of VRRP an be found in RFC 2338, by S. Knight, et al, April 1998, which is incorporated herein by reference for all purposes.

The HAD also has knowledge of the identity of each Home Agent in the Home Agent cluster. Thus, each HAD is either configured with the IP addresses of the Home Agents or otherwise able to determine the IP addresses of the Home Agents using a discovery protocol such as Cisco Discovery Protocol (CDP), available from Cisco Systems, Inc, located in San Jose, Calif., as shown at block 306.

In addition, one or more HADs monitor health, availability and/or load information associated with the Home Agents at block 308. For instance, the health, availability and/or load information may be provided by the Home Agents to the HAD(s) in an agent advertisement as well as separately via a discovery protocol such as Cisco Discovery Protocol (CDP), available from Cisco Systems, Inc. For instance, the load information may include the number of bindings currently supported, percentage of CPU utilization, and/or percentage of free memory. Yet another mode to provide availability and/or load information may be implemented using the Cisco Dynamic Feedback Protocol (CDFP), available from Cisco Systems, Inc.

Figure 4:
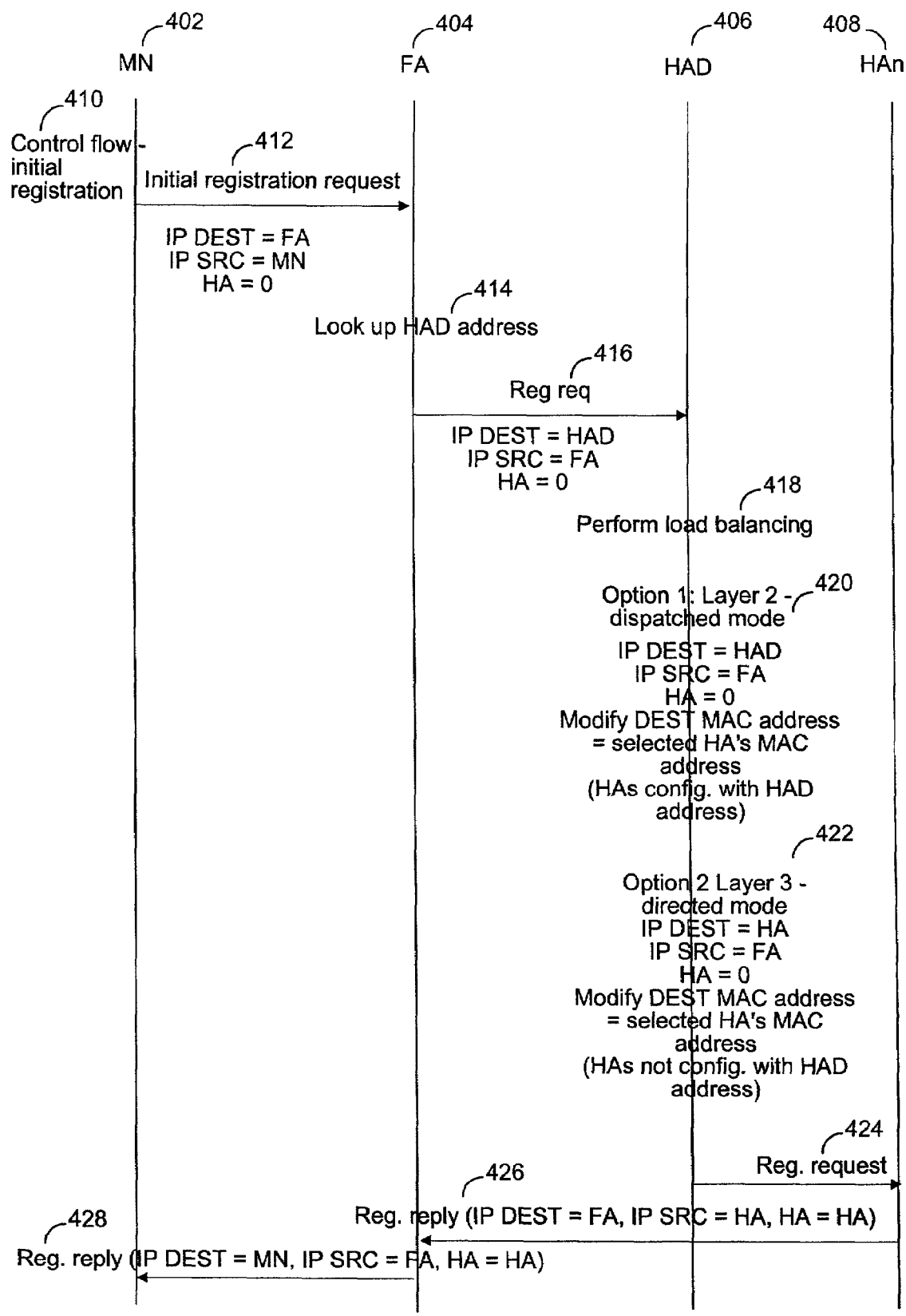
FIG. 4 is a control flow diagram illustrating a method of processing a registration request in accordance with various embodiments of the invention.

FIG. 4 is a control flow diagram illustrating a method of processing a registration request in accordance with various embodiments of the invention. Steps performed by the Mobile Node, Foreign Agent, Home Agent Director, and clustered Home Agent are represented by corresponding vertical lines 402, 404, 406, and 408, respectively.

As shown at 412, the Mobile Node sends a registration request to the Foreign Agent to which the Mobile Node has roamed. The registration request includes an IP destination address equal to the Foreign Agent care-of address an IP source address equal to the IP address of the Mobile Node. In addition, the registration request indicates that a Home Agent is to be assigned to the Mobile Node. For instance, the IP address of the Home Agent may be set to 0.0.0.0 or 255.255.255.255.

In this example, the HAD address is configured at the Foreign Agent (rather than at the Mobile Node). Thus, the Foreign Agent looks up the HAD IP address at 414 and provides a HAD IP address in the destination IP address field of the registration request. As described above, the destination IP address may be a virtual IP address. In addition, the source IP address of the registration request is set to the care-of address of the Foreign Agent. The Foreign Agent then relays the registration request to the HAD. As another example, the Foreign Agent may obtain the IP address of the HAD from a AAA server.

When the registration request is received by the HAD at 416, the HAD selects one of the plurality of Home Agents to receive and process the registration request. For instance, the HAD may select one of the Home Agents based upon health, load, and/or availability of the Home Agents at 418. In addition, the HAD ensures that additional registration requests from the Mobile Node are transmitted to the selected Home Agent if a registration request is already pending. For instance, the HAD may determine whether a registration request is pending for the selected Home Agent. The HAD may, for example, search a list of temporary bindings for a Mobile Node identifier (e.g., IP address) identified in the registration request. If a temporary binding is identified for the registration request, the registration request is forwarded to the Home Agent identified in the temporary binding. Otherwise, a new Home Agent is selected and the registration request is forwarded to the newly selected Home Agent. The HAD also creates a temporary binding for the Mobile Node in this case that identifies the newly selected Home Agent. Exemplary temporary bindings will be described in further detail below with reference to FIG. 5.

Once a Home Agent is selected, the registration request is sent to the selected one of the plurality of Home Agents. Since the source IP address of the registration request is an IP address of the Foreign Agent to which the Mobile Node has roamed, this enables the selected Home Agent to send a Mobile IP registration reply directly to the Foreign Agent without interception by the network device. In accordance with various embodiments, the registration request may be relayed to the selected Home Agent in two different manners depending upon whether the selected Home Agent and the HAD are layer 2 adjacent devices.

If the selected Home Agent and the HAD are layer 2 adjacent devices, the destination IP address is unmodified, as shown at 420. In other words, the destination IP address is an IP address (e.g., virtual IP address) of the HAD. In addition, the plurality of Home Agents are also configured with the IP address (e.g., virtual IP address) of the HAD (or group of HADs). In addition, the destination MAC address is modified to that of the selected Home Agent. For instance, the layer 2 option may be performed using Server Load Balancing Protocol, available from Cisco Systems, Inc., located in San Jose, Calif., in dispatched mode.

As shown at 422, if the selected Home Agent and the HAD are not layer 2 adjacent the destination IP address of the registration request is modified such that the destination IP address is an IP address of the Home Agent. In addition, the destination MAC address is modified to that of the selected Home Agent. In accordance with one embodiment, the layer 3 option may be performed using Server Load Balancing Protocol, available from Cisco Systems, Inc., located in San Jose, Calif., in directed mode. This mode enables a centralized HAD to load balance registration requests among geographically distributed Home Agents.

In either the layer 2 and layer 3 options, the Home Agent address of the registration request indicates that a Home Agent is to be assigned by the network device. For instance, in accordance with one embodiment, the Home Agent field of the registration request is set to 0.0.0.0, as described above. This enables the Home Agent to recognize that the Mobile Node is registering using dynamic Home Agent assignment.

In either option, the HAD sends the registration request to the selected Home Agent as shown at 424 such that the selected Home Agent creates a binding between the Mobile Node and the Foreign Agent identified by the source IP address of the registration request packet. Once the selected Home Agent receives the registration request, it processes the registration request according to RFC 3220. For instance, it creates a tunnel interface and creates a binding for the Mobile Node. It then sends a registration reply directly to the Foreign Agent at 426. As shown, the registration reply specifies a destination IP address equal to the Foreign Agent care-of address, a source IP address equal to the Home Agent address, and the Home Agent field specifying the Home Agent address. The Foreign Agent then forwards the registration reply to the Mobile Node at 428, where the registration reply specifies the source IP address of the Foreign Agent and the destination IP address of the Mobile Node.

As described above, the HAD preferably temporarily maintains minimal binding information to ensure that duplicative or multiple registration requests sent by the Mobile Node are sent to the same selected Home Agent. Thus, as described above with reference to FIG. 4, the HAD stores temporary bindings.

Figure 5:
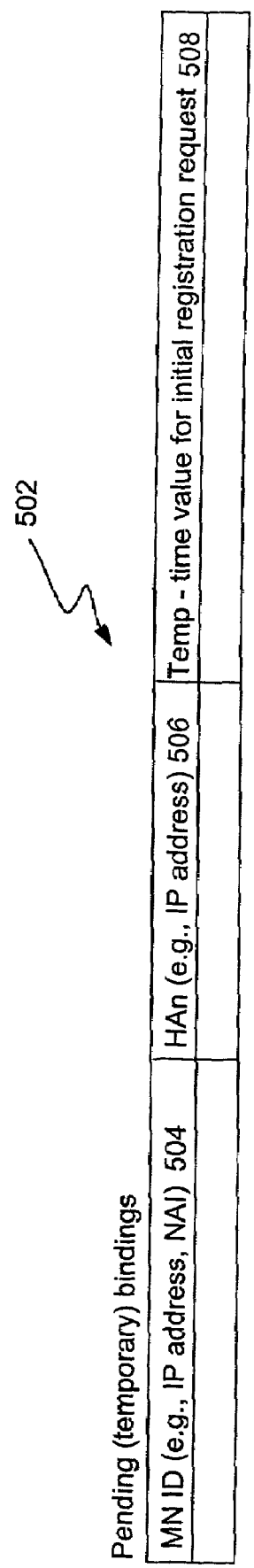
FIG. 5 is a diagram illustrating an exemplary table storing temporary, pending bindings in accordance with various embodiments of the invention.

FIG. 5 is a diagram illustrating an exemplary mobility binding table storing temporary, pending bindings in accordance with various embodiments of the invention. A table storing pending, temporary bindings 502 includes one or more pending bindings associated with pending registration requests sent to clustered Home Agent(s). More specifically, each entry identifies a Mobile Node with a Mobile Node identifier 504 such as an IP address. One standardized method for identifying users is proposed in RFC 2486 of the Network Working Group, January 1999, hereby incorporated by reference, which proposes syntax for the Network Access Identifier (NAI), the userID submitted by a client during Point to Point Protocol (PPP) authentication. Similarly, RFC 2794, "Mobile IP Network Access Identifier Extension for IPv4P," Calhoun et al, March 2000, which discloses the use of the NAI in a Mobile IP registration request, is incorporated herein by reference for all purposes. Thus, when a client is authenticated based upon the NAI, an IP address may be allocated for use by the client. Accordingly, a pending (i.e., temporary) binding entry may include the NAI instead of, or in addition to, the IP address. In addition, an entry may further include a selected Home Agent IP address 506, and a time value 508 during which an initial registration request from a Mobile Node is considered to be pending (processed). When a subsequent registration request is received from the Mobile Node during the time specified in the temporary binding, the subsequent request is sent to the selected Home Agent, thereby preventing unnecessary, duplicative registration requests from being transmitted to Home Agents in the Home Agent pool. The temporary binding is therefore maintained during this time, and preferably deleted upon expiration of this time. In this manner, storage requirements of the HAD are minimized. If the HAD receives a registration request for a Mobile Node whose temporary binding is found, the HAD forwards the registration request to the Home Agent and resets the timer associated with the binding. This essentially increases the duration of time during which the temporary binding is maintained at the HAD.

FIG. 6A is a control flow diagram illustrating a method of processing subsequent registration requests received from a Mobile Node in accordance with various embodiments of the invention. For instance, when the lifetime of a Mobile Node is about to expire, the Mobile Node may send a subsequent request to the Home Agent. In accordance with various embodiments of the invention, these subsequent re-registrations that are sent to the selected Home Agent are not intercepted by the HAD. For instance, as shown at 604, the Mobile Node sends a registration request to the Foreign Agent. The registration request is relayed at 606 to the selected Home Agent. The Home Agent sends a registration reply at 608 to the Foreign Agent, which is forwarded at 610 to the Mobile Node. Thus, as described above, the present invention conforms to current Mobile IP standards, and therefore does not require modifications to registration request or reply packets that are sent in accordance with RFC 2002. RFC 3220, C. Perkins, Ed., January 2002, "IP Mobility Support for IPv4," which replaces RFC 2002, is incorporated herein by reference for all purposes.

Once the selected HA has created a binding for the Mobile Node, the Mobile Node and the Correspondent Node may send data packets to one another. FIG. 6B is a data flow diagram illustrating a method of transmitting a data packet between a Mobile Node and a Correspondent Node in accordance with various embodiments of the invention. It is important to note that the HAD does not intercept data packets sent by the Mobile Node or sent to the Mobile Node. Thus, when the Mobile Node sends a data packet at 612 via the Foreign Agent, the Foreign Agent relays the data packet to the Corresponding Node via the Home Agent at 614. Similarly, when data packets are sent to the Mobile Node at its home address, the Home Agent forwards the data packet at 616 to the Foreign Agent, which sends the data packet to the Mobile Node at 618.

Figure 7:
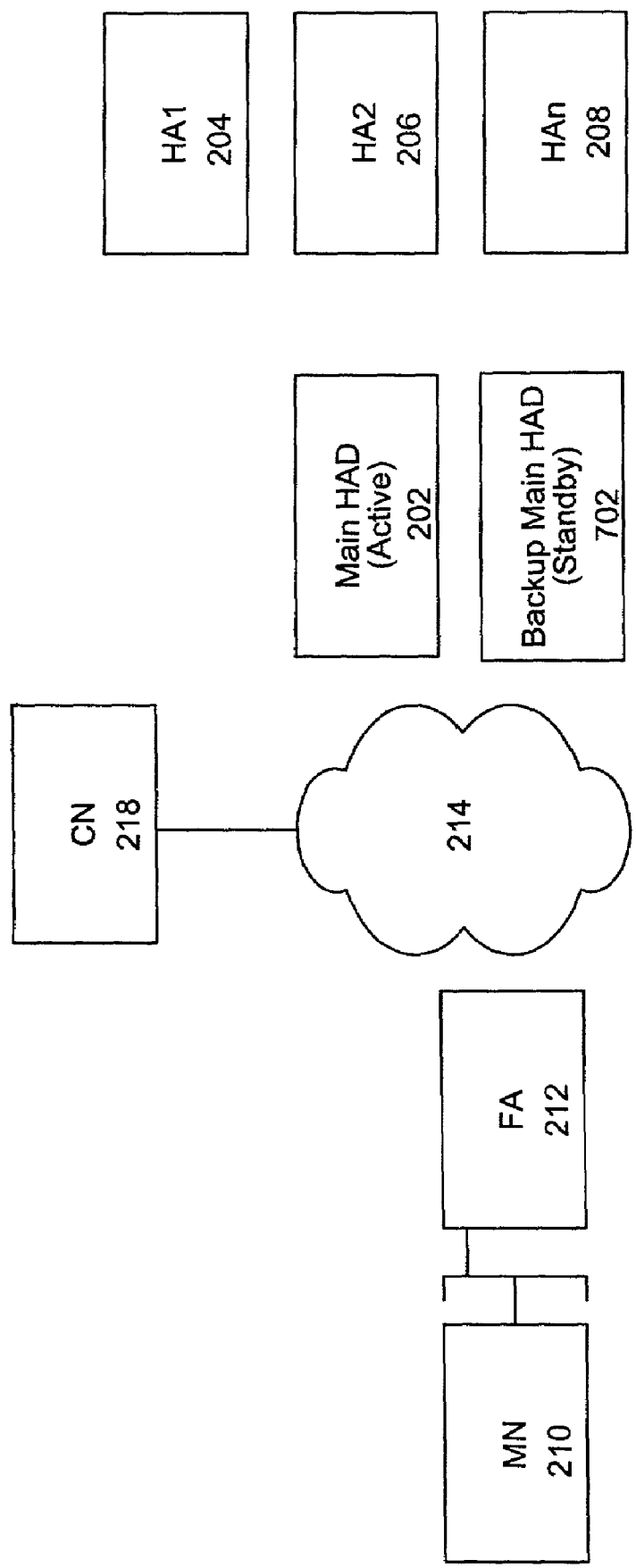
FIG. 7 is a diagram illustrating an exemplary system providing Home Agent Director redundancy in accordance with various embodiments of the invention.

FIG. 7 is a diagram illustrating an exemplary system providing Home Agent Director redundancy in accordance with various embodiments of the invention. In accordance with the embodiments described above, one or more backup HADs may support the HAD 202. More specifically, in this example, one or more backup HADs 702 support the main HAD 202 through a redundancy protocol such as Hot Standby Router Protocol (HSRP), and therefore the backup HAD 702 may be in standby mode while the main HAD 202 may be in active mode.

When backup HAD functionality is enabled, the main HAD periodically sends temporary bindings maintained by it to one or more backup HAD(s) 702 that can take over for the HAD 202 in the event of its failure. More specifically, these bindings will be those associated with pending bindings. In this manner, the backup HAD(s) may ensure that multiple registration requests that are sent by a Mobile Node are forwarded to a selected Home Agent while the initial registration request is pending. The temporary bindings may be associated with each Home Agent in the Home Agent pool managed by the HAD.

The clustered HAs and main HAD may discover each other, as well as share health and/or load information with one another. The health and load information may be provided separately or together in an agent advertisement as well as via a discovery protocol such as Cisco Discovery Protocol (CDP), available from Cisco Systems, Inc. Thus, the health and load information may be simultaneously transmitted to one or more HADs.

Other Embodiments

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, the Home Agents and Home Agent Directors of this invention may be implemented in specially configured routers, switches or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 8:
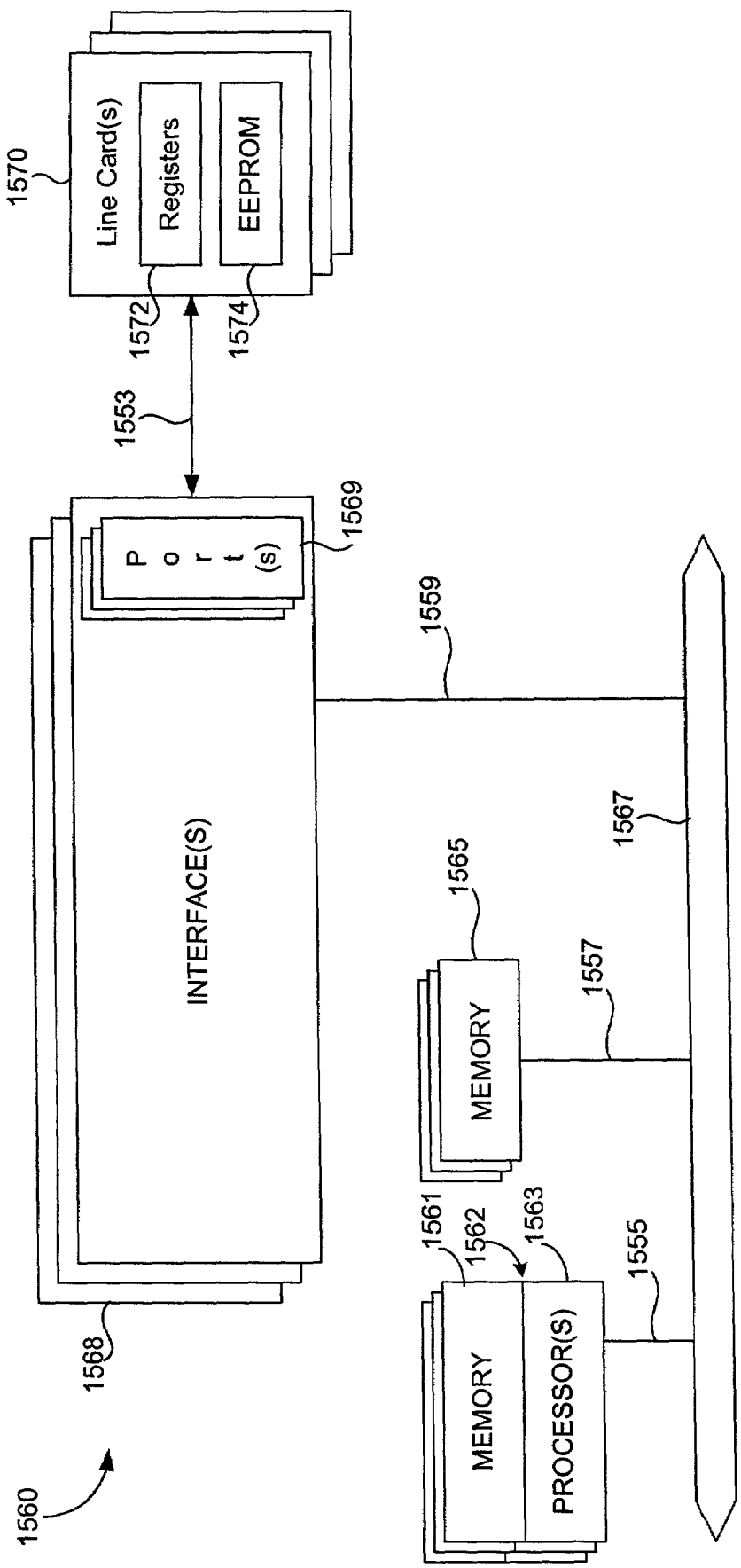
FIG. 8 is a diagram illustrating an exemplary network device in which embodiments of the invention may be implemented.

Referring now to FIG. 8, a network device 1560 suitable for implementing the techniques of the present invention includes a master central processing unit (CPU) 1562, interfaces 1568, and a bus 1567 (e.g., a PCI bus). When acting under the control of appropriate software or firmware, the CPU 1562 may be responsible for implementing specific functions associated with the functions of a desired network device. For example, when configured as an intermediate router, the CPU 1562 may be responsible for analyzing packets, encapsulating packets, and forwarding packets for transmission to a set-top box. The CPU 1562 preferably accomplishes all these functions under the control of software including an operating system (e.g. Windows NT), and any appropriate applications software.

CPU 1562 may include one or more processors 1563 such as a processor from the Motorola family of microprocessors or the MIPS family of microprocessors. In an alternative embodiment, processor 1563 is specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

The interfaces 1568 are typically provided as interface cards (sometimes referred to as "line cards"). Generally, they control the sending and receiving of data packets over the network and sometimes support other peripherals used with the network device 1560. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1562 to efficiently perform routing computations, network diagnostics, security functions, etc.

Although the system shown in FIG. 8 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being implemented to enable a mobile node to be dynamically assigned a Home Agent based upon its health and/or load information. However, it should be understood that the invention is not limited to such implementations, but instead would equally apply regardless of the context and system in which it is implemented. Thus, broadly speaking, the operations described above may be used to enable dynamic assignment with respect to other mobility agents, such as Foreign Agents. In addition, the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. A network device adapted for distributing a Mobile IP registration request to one of a plurality of Home Agents, comprising:

a processor; and a memory, at least one of the processor or the memory being adapted for:

receiving a registration request from a Foreign Agent to which the Mobile Node has roamed;

determining whether a binding for the Mobile Node exists in a list of temporary bindings;

if a binding for the Mobile Node is determined to exist in the list of temporary bindings, forwarding the registration request to the one of the plurality of Home Agents identified in the binding;

if it is determined that a binding for the Mobile Node does not exist in the list of temporary bindings, selecting one of the plurality of Home Agents to be an active Home Agent to which the registration request is to be forwarded, wherein an IP address associated with the selected one of the plurality of Home Agents has not previously been configured on the Mobile Node as a Home Agent of the Mobile Node, wherein the registration request that has been received does not identify the selected one of the plurality of Home Agents;

sending the registration request to the selected one of the plurality of Home Agents, the source IP address of the registration request being an IP address of the Foreign Agent to which the Mobile Node has roamed, thereby enabling the selected one of the plurality of Home Agents to send a Mobile IP registration reply directly to the Foreign Agent without interception by the network device, wherein the network device is not one of the plurality of Home Agents; and creating a binding associated with the Mobile Node in the list of temporary bindings, wherein the binding associated with the Mobile Node in the list of temporary bindings indicates that a registration request has been sent to the one of the plurality of Home Agents.

2. The network device as recited in claim 1, wherein the network device does not intercept data packets sent by the Mobile Node or sent to the Mobile Node.

3. The network device as recited in claim 1, wherein a subsequent registration request sent by the Mobile Node to the selected Home Agent is not intercepted by the network device.

4. The method as recited in claim 1, wherein the network device is a switch or router.

5. The network device as recited in claim 1, wherein the network device does not store a registration lifetime associated with the registration request.

6. The network device as recited in claim 1, at least one of the processor or the memory being further adapted for:
wherein a destination IP address of the registration request is an IP address of the network device;
wherein the plurality of Home Agents are configured with the IP address of the network device.

7. The network device as recited in claim 6, at least one of the processor or the memory being further adapted for:
modifying a destination MAC address of the registration request such that the destination MAC address is a MAC address associated with the selected Home Agent;
wherein the plurality of Home Agents and the network device are layer 2 adjacent.

8. The network device as recited in claim 7, wherein the method is performed using Server Load Balancing Protocol in dispatched mode.

9. The network device as recited in claim 1, at least one of the processor or the memory being further adapted for:
modifying the destination IP address of the registration request such that the destination IP address is an IP address of the selected one of the plurality of Home Agents.

10. The network device as recited in claim 9, wherein the destination MAC address of the registration request is not modified by the network device.

11. The network device as recited in claim 10, wherein the method is performed using Server Load Balancing Protocol in directed mode.

12. The network device as recited in claim 1, wherein the Home Agent address of the registration request indicates that a Home Agent is to be assigned by the network device.

13. The network device as recited in claim 12, wherein the Home Agent address of the registration request is zero.

14. The network device as recited in claim 1, wherein the destination IP address of the registration request is a virtual IP address.

15. The network device as recited in claim 14, wherein the virtual IP address is associated with the network device and one or more additional network devices adapted for performing the method of claim 1.

16. The network device as recited in claim 15, wherein the network device and the one or more additional network devices are each configured with a routing redundancy protocol.

17. The network device as recited in claim 16, wherein the routing redundancy protocol is HSRP or VRRP.

18. The network device as recited in claim 1, wherein the network device is configured with an IP address of the plurality of Home Agents.

19. The network device as recited in claim 1, at least one of the processor or the memory being further adapted for:
obtaining an IP address of the plurality of Home Agents.

20. The network device as recited in claim 19, wherein obtaining an IP address of the plurality of Home Agents is performed using a Discovery Protocol.

21. The network device as recited in claim 1, wherein selecting one of the plurality of Home Agents comprises:
selecting one of the plurality of Home Agents according to information indicating at least one of health, load conditions, or availability of the plurality of Home Agents.

22. The network device as recited in claim 21, at least one of the processor or the memory being further adapted for:
monitoring at least one of health, load conditions, and availability of the plurality of Home Agents.

23. The network device as recited in claim 22, wherein monitoring is performed using Cisco Discovery Protocol or Dynamic Feedback Protocol.

24. The network device as recited in claim 1, wherein the binding includes a Mobile Node identifier, address of the selected Home Agent, and time during which the-binding will be maintained.

25. The network device as recited in claim 24, at least one of the processor or the memory being further adapted for:
deleting the binding when the time has expired.

26. The network device as recited in claim 24 at least one of the processor or the memory being further adapted for:
if a re-registration request is received before the time has expired, renewing the time in the temporary binding.

27. The network device as recited in claim 1, at least one of the processor or the memory being further adapted for;
sending the binding for one or more Mobile Nodes identified in the list of temporary bindings to one or more backup network devices, wherein the one or more backup network devices are not Home Agents, wherein each binding is not a mobility binding table entry.

28. The network device as recited in claim 24, at least one of the processor or the memory being further adapted for:
sending a subsequent registration request received from the Mobile Node to the address of the selected Home Agent if the subsequent registration request is received during the time specified in the binding.

29. The network device as recited in claim 1, at least one of the processor or the memory being further adapted for:
retaining the source IP address of the registration request as the source IP address of the Foreign Agent, thereby enabling the selected Home Agent that receives the registration request to send a registration reply to the Foreign Agent.

30. A network device for distributing a Mobile IP registration request to one of a plurality of Home Agents, comprising:
means for receiving a registration request from a Foreign Agent to which the Mobile Node has roamed;
means for determining whether a binding for the Mobile Node exists in a list of temporary bindings;
means for forwarding the registration request to the one of the plurality of Home Agents identified in the binding if a binding for the Mobile Node is determined to exist in the list of temporary bindings;
means for selecting one of the plurality of Home Agents to be an active Home Agent to which the registration request is to be forwarded, sending the registration request to the selected one of the plurality of Home Agents, and creating a temporary binding associated with the Mobile Node in the list of temporary bindings if it is determined that a binding for the Mobile Node does not exist in the list of temporary bindings, wherein an IP address associated with the selected one of the plurality of Home Agents has not previously been configured on the Mobile Node as a Home Agent of the Mobile Node, wherein the registration request that has been received does not identify the selected one of the plurality of Home Agents, the source IP address of the registration request being an IP address of the Foreign Agent to which the Mobile Node has roamed, thereby enabling the selected one of the plurality of Home Agents to send a Mobile IP registration reply directly to the Foreign Agent without interception by the network device, wherein the network device is not one of the plurality of Home Agents.

31. The method as recited in claim 1, wherein the selected Home Agent is not identified in the registration request.

32. In a network device, a method of distributing a Mobile IP registration request to one of a plurality of Home Agents, the method comprising:
receiving a registration request from a Foreign Agent to which the Mobile Node has roamed;
determining whether a binding for the Mobile Node exists in a list of temporary bindings;
if a binding for the Mobile Node is determined to exist in the list of temporary bindings, forwarding the registration request to the one of the plurality of Home Agents identified in the binding;
if it is determined that a binding for the Mobile Node does not exist in the list of temporary bindings,
selecting one of the plurality of Home Agents to be an active Home Agent to which the registration request is to be forwarded, wherein an IP address associated with the selected one of the plurality of Home Agents has not previously been configured on the Mobile Node as a Home Agent of the Mobile Node, wherein the registration request that has been received does not identify the selected one of the plurality of Home Agents;
sending the registration request to the selected one of the plurality of Home Agents, the source IP address of the registration request being an IP address of the Foreign Agent to which the Mobile Node has roamed, thereby enabling the selected one of the plurality of Home Agents to send a Mobile IP registration reply directly to the Foreign Agent without interception by the network device, wherein the network device is not one of the plurality of Home Agents; and
creating a binding associated with the Mobile Node in the list of temporary bindings.

33. The method as recited in claim 1, wherein the registration request that has been received does not identify the plurality of Home Agents.

34. The network device as recited in claim 1, wherein the network device is not a Home Agent.

35. The network device as recited in claim 1, further comprising:
resetting a timer associated with the binding if a binding for the Mobile Node is determined to exist in the list of temporary bindings, thereby increasing a time during which the binding is maintained in the list of temporary bindings.

36. The network device as recited in claim 24, at least one of the processor or the memory being further adapted for:
maintaining the temporary binding until the Mobile Node is registered with the one of the plurality of Home Agents.

37. The network device as recited in claim 1, wherein the network device does not intercept registration replies sent from the one of the plurality of Home Agents.

38. The network device as recited in claim 1, wherein the network device is not a Foreign Agent.

39. The network device as recited in claim 1, wherein the registration request identifies a care-of address of the Mobile Node and wherein the binding does not include the care-of address of the Mobile Node.

40. The network device as recited in claim 24, wherein the time during which the binding will be maintained is not a registration lifetime indicating a lifetime during which the Mobile Node is registered with the selected Home Agent.

41. The network device as recited in claim 24, wherein the time during which the binding will be maintained is a time during which an initial registration request from the Mobile Node is considered to be pending.

42. The network device as recited in claim 30, wherein the binding associated with the Mobile Node in the list of temporary bindings indicates a time during which the binding will be maintained, wherein the time during which the binding will be maintained is a time during which an initial registration request from the Mobile Node is considered to be pending.

43. The method as recited in claim 32, wherein the binding associated with the Mobile Node in the list of temporary bindings does not include a registration lifetime associated with a binding between the Mobile Node and the one of the plurality of Home Agents to which the registration request has been forwarded 44. The method as recited in claim 32, wherein the binding associated with the Mobile Node in the list of temporary bindings indicates a time during which the binding will be maintained, wherein the time during which the binding will be maintained is a time during which an initial registration request from the Mobile Node is considered to be pending.

45. The network device as recited in claim 24, wherein forwarding the registration request to the one of the plurality of Home Agents identified in the binding is performed if the registration request is received from the Mobile Node during the time specified in the binding.

* * * * *